(12) United States Patent
Mattila

(10) Patent No.: US 12,383,940 B2
(45) Date of Patent: Aug. 12, 2025

(54) APPARATUS FOR DRIVING TOOLS VIA INTERCHANGEABLE FLEXIBLE SHAFTS

(71) Applicant: Harmatek Oy, Helsinki (FI)

(72) Inventor: Harri Mattila, Helsinki (FI)

(73) Assignee: Harmatek Oy, Helsinki (FI)

( * ) Notice: Subject to any disclaimer, the term of this patent is extended or adjusted under 35 U.S.C. 154(b) by 609 days.

(21) Appl. No.: 17/700,520

(22) Filed: Mar. 22, 2022

(65) Prior Publication Data

US 2022/0402002 A1     Dec. 22, 2022

(30) Foreign Application Priority Data

Jun. 18, 2021   (FI) .................................... 20215720

(51) Int. Cl.
| | |
|---|---|
| *B08B 9/045* | (2006.01) |
| *B65H 75/34* | (2006.01) |
| *H02K 11/00* | (2016.01) |

(52) U.S. Cl.
CPC ............ *B08B 9/045* (2013.01); *B65H 75/34* (2013.01); *B08B 2209/04* (2013.01); *H02K 11/0094* (2013.01)

(58) Field of Classification Search
CPC ..... B08B 9/045; B08B 2209/04; B65H 75/34; H02K 11/0094
See application file for complete search history.

(56) References Cited

U.S. PATENT DOCUMENTS

| | | | | |
|---|---|---|---|---|
| 4,716,613 A | * | 1/1988 | Irwin ...................... | E03F 9/005 15/104.33 |
| 4,734,951 A | * | 4/1988 | Prange .................... | E03F 9/005 15/104.33 |
| 2019/0346330 A1 | | 11/2019 | Krohlow | |
| 2021/0172162 A1 | | 6/2021 | Cole et al. | |

FOREIGN PATENT DOCUMENTS

| | | |
|---|---|---|
| CH | 693588 A5 | 10/2003 |
| FI | 121871 B | 5/2011 |

\* cited by examiner

*Primary Examiner* — Andrew A Horton
(74) *Attorney, Agent, or Firm* — Laine IP Oy

(57) ABSTRACT

An apparatus for driving interchangeable flexible shafts. The apparatus having a stand; a platform coupled to the stand, the platform being configured to rotate around an axis of rotation; a disconnect affixed to the platform, the disconnect being configured to connect a rotary power source to a flexible shaft; and fasteners affixed to the platform, the fasteners being configured to releasably couple a reel for the flexible shaft to the platform.

16 Claims, 6 Drawing Sheets

APPARATUS FOR DRIVING TOOLS VIA INTERCHANGEABLE FLEXIBLE SHAFTS

BACKGROUND

Apparatuses for driving tools via flexible shafts may be used in a variety of applications. Tools driven via flexible shafts are especially useful when cleaning tubes, ducts or pipes. For example, duct and pipe cleaning apparatuses use a flexible shaft to drive brushes to clean air ducts, water pipes, drain pipes or sewer pipes. Rotational movement of the flexible shaft is translated to the brush which rotates inside of the duct or pipes as the flexible shaft is fed into the duct and then withdrawn. In some applications, the flexible shaft may be stored partially coiled as the flexible shaft drives the tool.

Especially when employed to clean ducts and pipes, apparatuses for driving tools via flexible shafts may require that the flexible shafts be changed during different portions of the job. For example, if first a large diameter pipe is being cleaned and then the operator needs to clean a smaller diameter pipe. Traditionally such a change would require completely uncoiling the flexible shaft in order to connect another flexible shaft. This is time and labor intensive and requires a lot of space or careful management of the flexible shaft as it is uncoiled.

As such, it would be beneficial if there were a system that allowed for easily interchangeable flexible shafts.

SUMMARY OF THE INVENTION

The invention is defined by the features of the independent claims. Some specific embodiments are defined in the dependent claims.

According to a first aspect of the present invention, there is provided an apparatus for driving interchangeable flexible shafts, the apparatus comprising a stand; a platform coupled to the stand, the platform being configured to rotate around an axis of rotation; a disconnect affixed to the platform, the disconnect being configured to connect a rotary power source to a flexible shaft; and fasteners affixed to the platform, the fasteners being configured to releasably couple a reel for the flexible shaft to the platform.

EMBODIMENTS

When driving tools via flexible shafts, especially when driving them via a self-contained apparatuses including a motor, it can be advantageous to switch between different flexible shafts and/or tools. For example, smaller diameter flexible shafts may be more efficient when used with smaller tools. Tools designed for use with larger diameter tubes require a durable, thicker, flexible shaft whereas potentially steep bends of smaller pipes may require a thinner and more flexible shaft. Further, more or less flexible shafts may more efficiently translate energy. Certain flexible shafts may be equipped to also provide for a fluid flow while driving a tool.

An apparatus for driving tools via flexible shafts may employ a variety of flexible shafts during a particular job according to the parameters of the flexible shaft most suited for the current task. Flexible shafts of varying parameters may be better suited for different applications. For example, when employed for cleaning pipes and ducts, say within an apartment building, one flexible shaft may be suited for driving a brush through the air ducts to remove dust while another may be suited for driving a tool for cleaning out buildup on the drain pipes of the same building, and still another may be best suited to drive a tool to clean buildup of cooking residue from exhaust ducts connected to hoods in kitchens. Embodiments of the present invention allow for quickly changing between flexible shafts without requiring that a first flexible shaft and tool combination be completely uncoiled before it can be exchanged for a second flexible shaft and tool combination.

FIGS. 1A-1G illustrate an apparatus 100 for driving interchangeable flexible shafts in accordance with embodiments of the present invention.

Figure 1A:
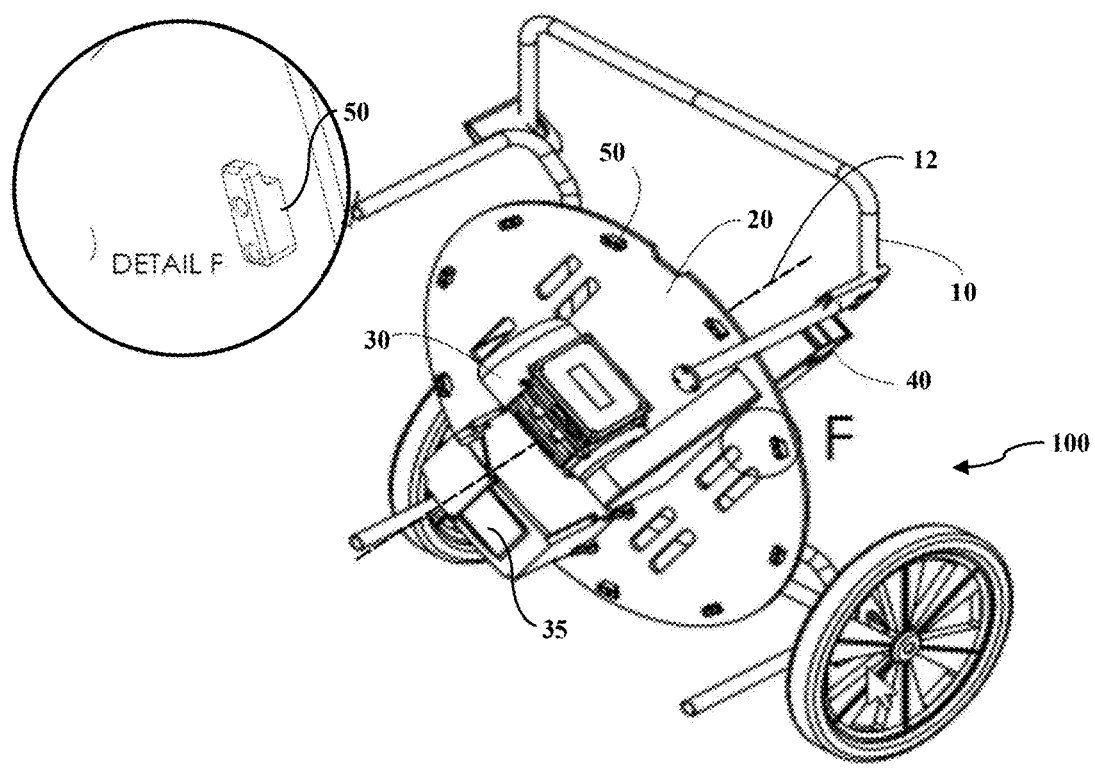
FIGS. 1A-1G illustrate an apparatus for driving tools via interchangeable flexible shafts in accordance with at least some embodiments of the present invention.

FIG. 1A illustrates an apparatus 100 for driving interchangeable flexible shafts in accordance with at least some embodiments of the present invention. For example, tools used to clean tubes, ducts or pipes, such as air ducts and plumbing installations. As seen, the apparatus 100 comprises: a stand 10; and a platform 20 coupled to the stand 10, the platform 20 being configured to rotate around an axis of rotation 12; a disconnect 40 affixed to the platform 20, the disconnect 40 being configured to connect a rotary power source 30 to a flexible shaft and fasteners 50 affixed to the platform 20, the fasteners 50 being configured to releasably couple a reel 60 for the flexible shaft to the platform 20.

The fasteners 50 are configured such that a reel for coiling the flexible shaft may be coupled and decoupled by a user of the apparatus. In other words, the fasteners 50 are configured to detachably connect a reel for the flexible shaft. Put another way, the fasteners 50 are configured to releasably affix the reel. By providing for this interchangeability of reels, embodiments of the claimed invention ease the exchange of flexible shafts. Certain embodiments of the present invention do not require the use of any tools for a user to exchange reels.

Within FIGS. 1A-1G, the rotary power source 30 is illustrated as a motor mounted to the platform 20 as employed by certain embodiments of the present invention. At least some embodiments employ an electric motor. Within certain embodiments of the present invention a power source 35 is mounted to the platform. At least some embodiments employ a battery as the power source 35. Such a battery may be releasably installed onto the platform. A wide variety of batteries may be suited for use, for example, rechargeable batteries such as those used to power hand tools such as a drill.

Figure 1B:
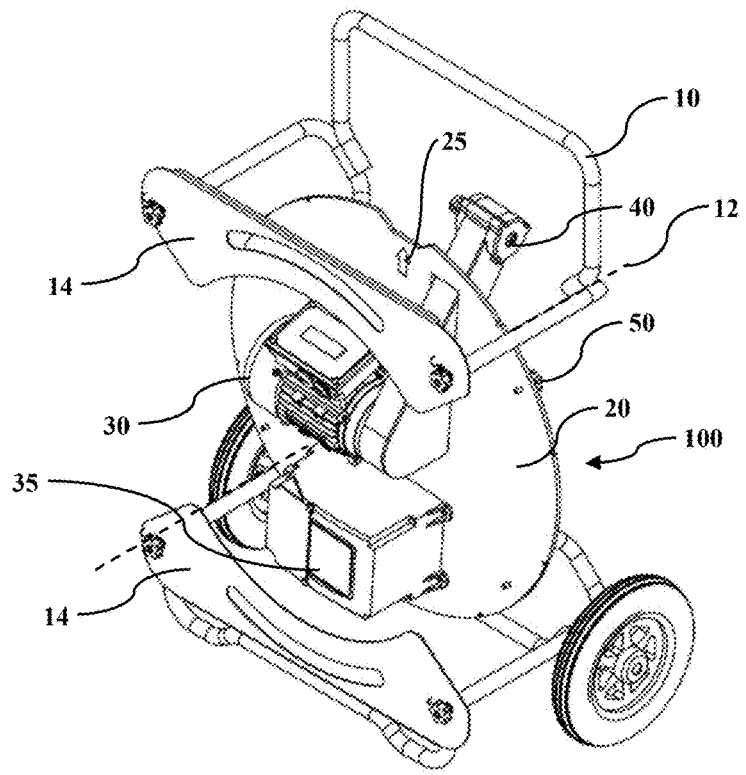

FIG. 1B shows how, in certain embodiments, the apparatus 100 further comprises front plates 14 affixed to the apparatus to aid in coiling and uncoiling of the flexible shaft. Such front plates also prevent the shaft from falling off when being dispensed. As illustrated in FIG. 1B the front plates 14 may be affixed to the stand 10 using the same type of fasteners as used to releasably affix the reel 60 to the platform 20. Some embodiments also comprise rollers to aid in movement of the flexible shaft. Such rollers are attached to front plates in some embodiments while in other embodiments the rollers are affixed to the stand. A few embodiments provide for a stand which further comprises posts surrounding the platform and extending perpendicular to a plane of the platform. Such posts may comprise rollers and also assist in the coiling and uncoiling of the flexible shaft.

Figure 1C:
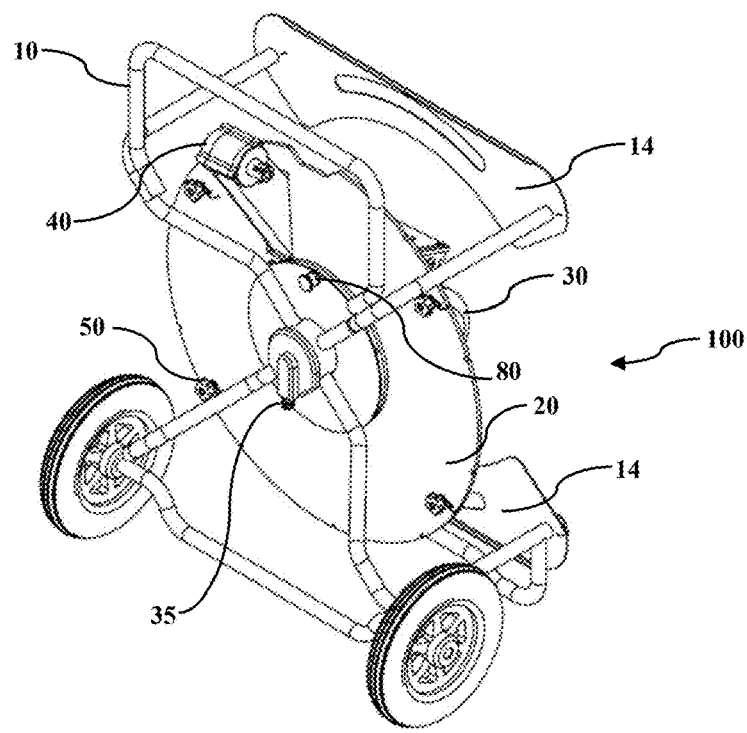
Figure 1D:
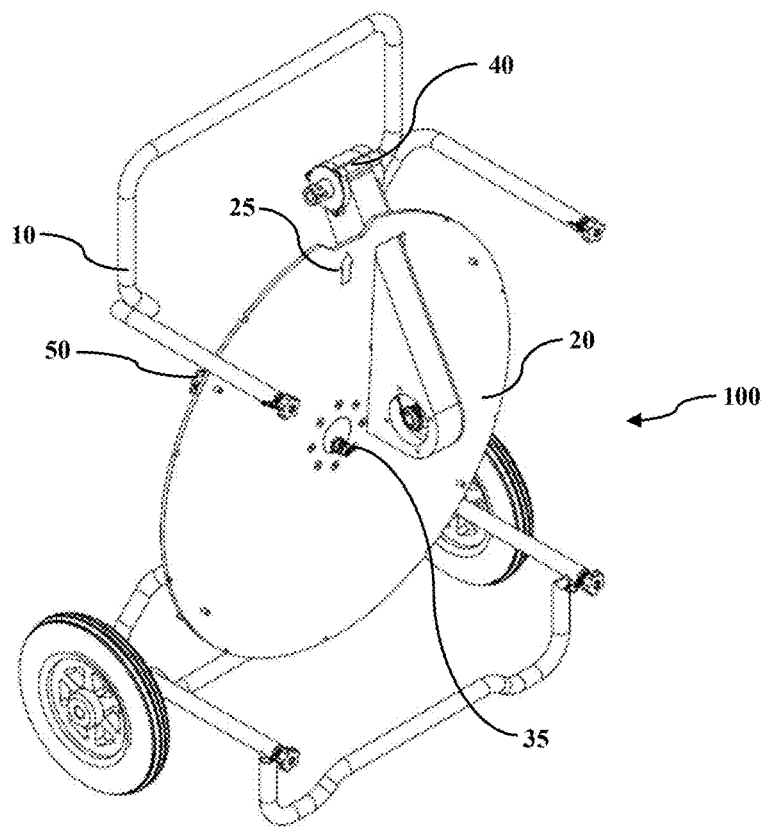

As illustrated within FIGS. 1C and 1D, certain embodiments employ slip rings or a series of slip rings and conductors as the power source 35. The slip rings serve to transfer electrical energy to an electric motor mounted on the platform while allowing for an electrical energy source, such as a battery or generator, to be stored or mounted elsewhere.

As seen in FIG. 1C, at least some embodiments of the present invention employ a lock or stop 80 to prevent the platform from spinning, for example when exchanging reels or transporting the apparatus. Certain embodiments further comprise a locking mechanism to secure the reel on the platform and prevent the reel from disengaging or decoupling accidentally.

FIG. 1D is shown without the motor in order to better illustrate the configuration of the slip rings 35 as a power source.

A number of embodiments employ a linkage as the power source 30, the linkage being mounted to the platform and configured to accept rotary power from a source outside of the platform 20 and transfer it to the disconnect 40. For example, the linkage may be configured to interface with a motor mounted to the stand 10.

Figure 1E:
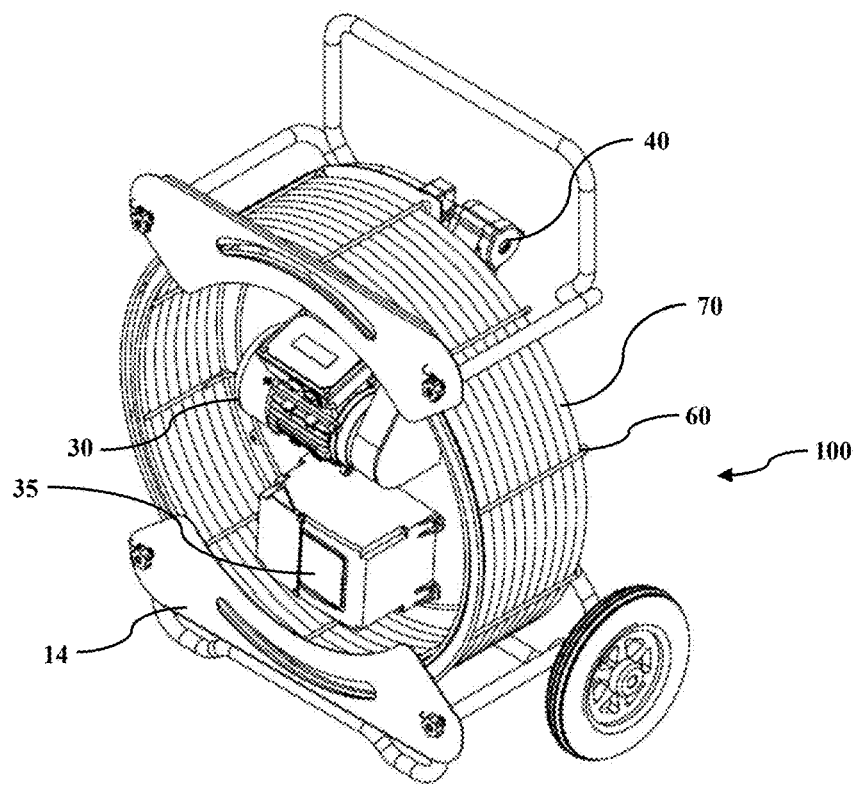

As seen in FIG. 1E, at least some embodiments of the present invention further comprise a reel 60 coupled to the platform 20 via the fasteners 50. In certain embodiments the reel further comprises a flexible shaft 70 on the reel 60, the flexible shaft 70 being connected to the rotary power source 30 via the disconnect 40. As also illustrated, within at least some embodiments of the present invention, the reel 60 is at least partly constructed of a wire frame.

In certain embodiments of the present invention, such as the embodiment illustrated within FIG. 1A, the fasteners 50 comprise hooks, such as hooks configured to engage with a wire frame reel and allowing a rotatable disconnect of the reel from the platform. FIG. 1A shows a fastener 50 with greater detail inside the detail F as annotated.

A wide variety of fasteners may be employed to secure the reel to the platform. At least some embodiments employ screws, such as knob headed screws affixed to the platform in order to secure the reel to the platform as shown in FIGS. 1B-1G.

A number of embodiments of the present invention provide for fasteners 50 that are configured to couple the reel 60 for the flexible shaft such that the reel 60 may be decoupled by rotating the reel 60 relative to the platform 20. This rotation of the reel relative to the platform may be in a variety of directions and manners. For example, in some embodiments the fasteners are configured such that they allow for the reel to rotate around the axis of rotation 12 relative to the platform and thus disconnect the reel from the platform. Such fasteners may comprise hooks.

Still other fasteners according to some embodiments are configured such that the reel may be rotated away from a face of the platform. For example, at least one fastener could comprise a hook which holds the bottom of a reel as the top is pulled away from the platform thus causing the reel to rotate away and become decoupled from the platform. The fasteners may also be such that the hook fastener is at the top and the bottom of the reel is pulled away from the platform in order to disengage the reel.

In at least some embodiments the fasteners are non-uniform. For example, there may be one fastener which comprises a hook and the other fasteners are configured to interface with the reel as the reel is rotated about the hook fasteners similar to the discussion above.

In many embodiments of the present invention the rotary power source 30 is mounted to the platform 20 such that it is inside of the fasteners 50 as shown in FIG. 1A. That is the rotary power source 30 is mounted within a circumference comprised of the fasteners 50.

Figure 1F:
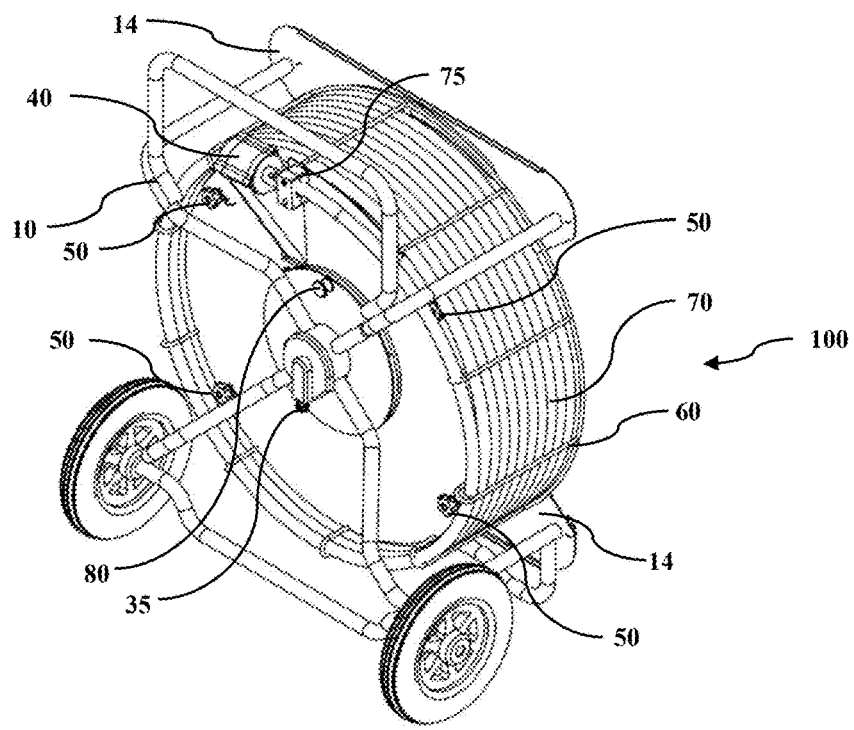

FIG. 1F provides a clear view of the fasteners, illustrated here as knob head screws affixed to the platform, which provide for an easy and reliable method of releasably coupling a reel to the platform.

As also shown in FIG. 1F, within at least some embodiments, the flexible shaft 70 is affixed to the reel at least at a terminal portion of the flexible shaft near where the flexible shaft is to engage with the disconnect 40. Within FIG. 1F, a two part clamp is employed as a flexible shaft locking mechanism 75.

At least some embodiments which employ an electric motor as the rotary power source 30 further provide for an energy source, such as a battery, and control electronics to be mounted to the platform, for example within a circumference defined by the fasteners.

Figure 1G:
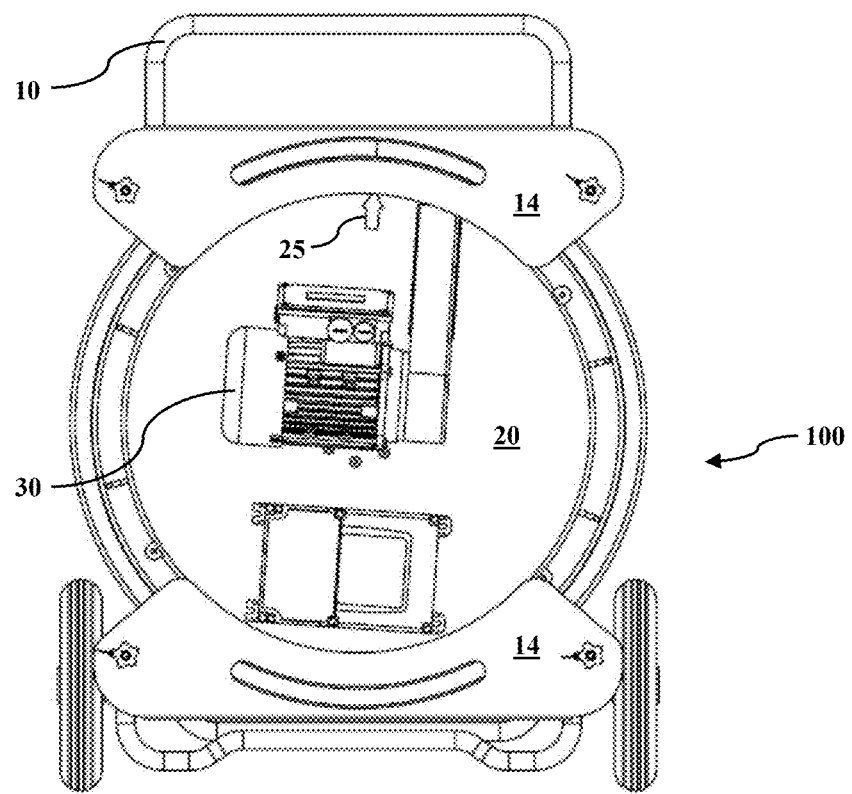

As seen in FIGS. 1B, 1D and 1G, some embodiments of the present invention further comprise an indicator 25 provided on the platform 20. In certain embodiments, this indicator 25 may be used with a corresponding reel marking in order to guide a user when mounting the reel to the platform. For example, the reel may have a marking to indicate the orientation of the reel appropriate for mounting to the platform and such a marking should align with the indicator when the reel is in the correct position. As another example, the indicator 25 may correspond with a wire of a wire frame reel, such a wire may be colored differently or otherwise highlighted.

As seen in FIG. 1E, at least some embodiments of the present invention further comprise a reel 60 coupled to the platform 20 via the fasteners 50. In certain embodiments the reel further comprises a flexible shaft 70 on the reel 60, the flexible shaft 70 being connected to the rotary power source 30 via the disconnect 40. As also illustrated, within at least some embodiments of the present invention, the reel 60 is at least partly constructed of a wire frame. Embodiments of the present invention may employ a variety of materials for the reel, including a variety of materials, including plastic, for reels which are at least partly constructed of a wire frame. In certain embodiments the reel is constructed of a drum. Some embodiments employ a tube as a reel.

Figure 2A:
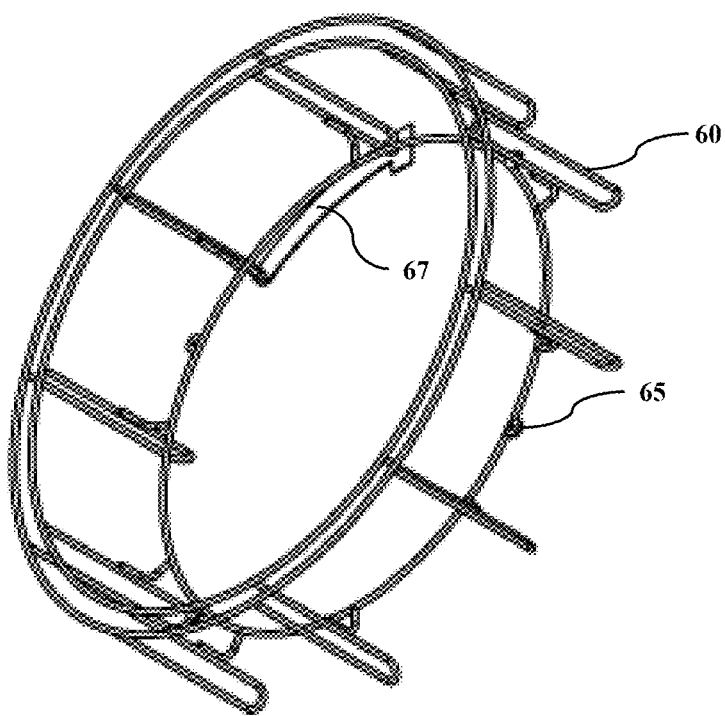
FIGS. 2A and 2B illustrate a reel for use in certain embodiments of the present invention.
Figure 2B:
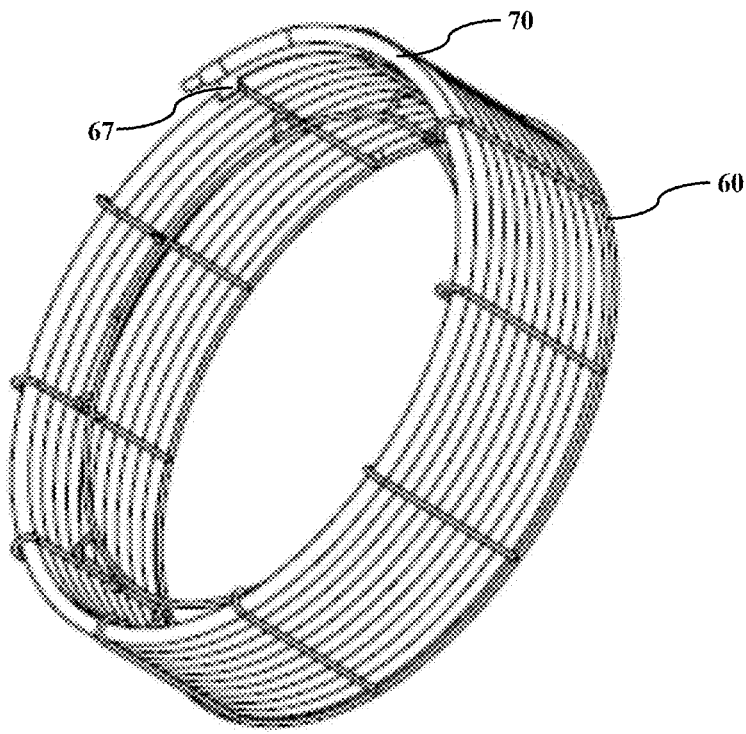

FIGS. 2A and 2B illustrate a reel 60 for use in certain embodiments of the present invention. As shown, the reel 60 is at least partly constructed of a wire frame. Such a wire frame may be configured to engage with fasteners in a variety of fashions. Within FIG. 2A, fastener accepters 65 are shown. Such fastener accepters 65 may take the form of threaded holes which are configured to engage with screw type fasteners. Other examples of fasteners accepters 65 include, but are not limited to, slotted holes, smooth bore holes, or slots.

At least some reels 60 for use in embodiments of the present invention further comprise a reel platform 67 for affixing a terminal end of the flexible shaft 70 to the reel 60. For example by using a hose clamp or other clamp to affix the flexible shaft 70 to the reel 70.

Flexible shafts according to certain embodiments of the present invention are enclosed within a tube, such as a tube comprised of a fluoropolymer or polyamide material, the flexible shaft and any attached tool being rotatable in relation to the tube. Within certain embodiments the flexible shaft is metal ensconced in a tube or casing. While in other embodiments there is no enclosure surrounding the flexible shaft.

Figure 3A:
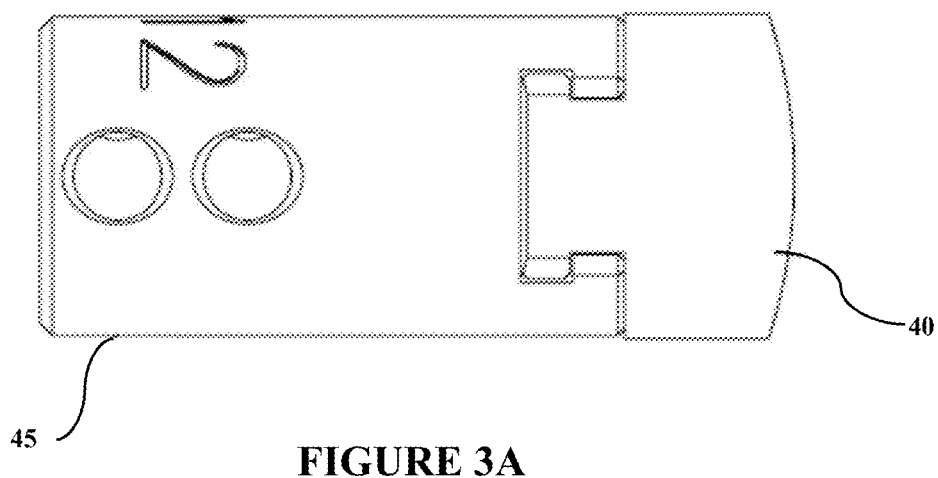
FIGS. 3A and 3B illustrate disconnects used in at least some embodiments of the present invention.
Figure 3B:
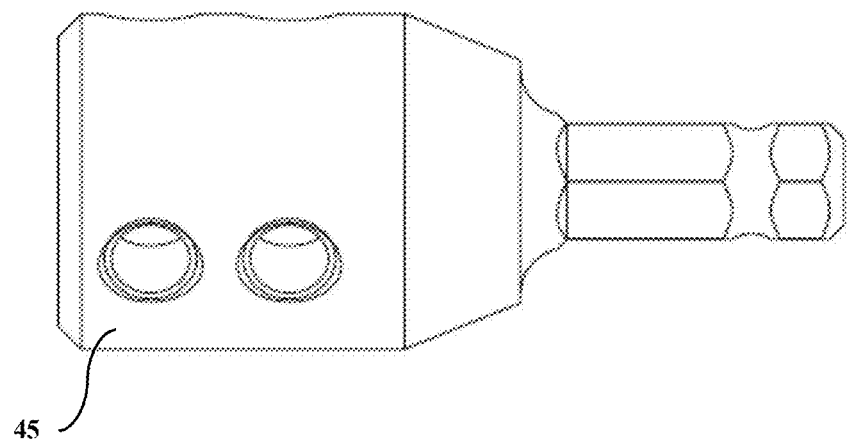

FIGS. 3A and 3B show disconnects according to certain embodiments of the present invention. The disconnect 40 of FIG. 3A finds use in embodiments wherein the reel is affixed to the platform via fasteners which do not require the reel to rotate relative to the platform. For example, the embodiment of FIG. 1A which uses knob screw fasteners. As seen, the disconnect of FIG. 3A takes the form of spindle having a protrusion shaped to match a slot in a shaft end 45, the shaft end 45 being affixed to the flexible shaft. Within FIG. 3A the protrusion takes a t shape but may be any suitable shape.

FIG. 3B shows a shaft end 45 suited for use in embodiments wherein the reel rotates relative to the platform when being affixed to the platform. For example, the embodiments of FIG. 1A wherein hooks are used. The shaft end 45 of FIG. 3B interfaces well a variety of chucks, including any standard drill chuck which may serve as a disconnect 40 in certain embodiments.

Certain embodiments of the present invention employ a quick disconnect as the disconnect.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

10 Stand
12 Axis of Rotation
14 Front Plates
20 Platform
25 Indicator
30 Rotary Power Source
35 Power Source
40 Disconnect
45 Shaft End
50 Fasteners
60 Reel
65 Fastener Accepters
67 Reel Platform
70 Flexible Shaft
75 Flexible Shaft Locking Mechanism
80 Stop
100 Apparatus

The invention claimed is:

1. An apparatus for driving an interchangeable flexible shaft, the apparatus comprising:
a stand;
a platform coupled to the stand, the platform being configured to rotate around an axis of rotation;
a reel comprising a coil of a flexible shaft;
a plurality of fasteners configured to releasably couple the reel to the platform;
a rotary power source comprising a linkage; and
a disconnect, wherein an end of the flexible shaft is releasably coupled to the disconnect and the rotary power source is coupled to the disconnect such that rotary power is transferred from the rotary power source to the disconnect to cause rotation of the flexible shaft.

2. The apparatus of claim 1, further comprising the rotary power source, wherein the rotary power source comprises a motor mounted to the platform.

3. The apparatus of claim 2, further comprising a power source for the motor, the power source being mounted to the platform.

4. The apparatus of claim 2, wherein the rotary power source is an electric motor.

5. The apparatus of claim 1, wherein the fasteners are configured such that the reel may be decoupled by a user of the apparatus.

6. The apparatus of claim 1, wherein the linkage is mounted to the platform, the linkage being configured to accept rotary power from a source outside of the platform and transfer it to the disconnect.

7. The apparatus of claim 1, wherein the fasteners are configured to couple the reel for the flexible shaft such that the reel may be decoupled by rotating the reel relative to the platform.

8. The apparatus of claim 1, wherein the reel is at least partly constructed of a wire frame.

9. The apparatus of claim 1, wherein a motor is mounted within a circumference comprised of the fasteners.

10. The apparatus of claim 1, wherein the fasteners comprise hooks or screws.

11. The apparatus of claim 1, further comprising a lock or stop to prevent the platform from rotating around the axis of rotation.

12. The apparatus of claim 1, further comprising a locking mechanism to secure the reel on the platform.

13. The apparatus of claim 1, further comprising front plates added to the reel, the front plates being configured to aid in coiling the flexible shaft.

14. The apparatus of claim 1, wherein no tools are required for a user to exchange reels.

15. The apparatus of claim 1, wherein:
   the reel is at least partly constructed of a wire frame, and
   the fasteners comprise hooks configured to engage with the reel and allow a rotating disconnect of the reel from the platform.

16. The apparatus of claim 1, wherein the rotation of the flexible shaft comprises torsional rotation of the entire flexible shaft.

\* \* \* \* \*